United States Patent
Yu et al.

(10) Patent No.: US 11,506,823 B2
(45) Date of Patent: Nov. 22, 2022

(54) NANOIMPRINTED MICROLENS ARRAY AND WAVEFRONT SENSOR BASED THEREON

(71) Applicant: Facebook Technologies, LLC, Menlo Park, CA (US)

(72) Inventors: Hao Yu, Redmond, WA (US); Lu Lu, Kirkland, WA (US); Mengfei Wang, Seattle, WA (US); Barry David Silverstein, Kirkland, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 491 days.

(21) Appl. No.: 16/741,500

(22) Filed: Jan. 13, 2020

(65) Prior Publication Data
US 2021/0215856 A1   Jul. 15, 2021

(51) Int. Cl.
| | |
|---|---|
| *G02B 3/08* | (2006.01) |
| *G02B 3/00* | (2006.01) |
| *G01B 11/24* | (2006.01) |
| *G01S 17/10* | (2020.01) |
| *G01S 7/481* | (2006.01) |

(52) U.S. Cl.
CPC ............ *G02B 3/08* (2013.01); *G01B 11/24* (2013.01); *G01S 7/481* (2013.01); *G01S 17/10* (2013.01); *G02B 3/0012* (2013.01)

(58) Field of Classification Search
CPC ......... G02B 3/0012; G02B 3/08; G01S 7/481; G01S 17/10; G01B 11/24
See application file for complete search history.

(56) References Cited

U.S. PATENT DOCUMENTS

| 2007/0146531 A1 | 6/2007 | Toshikiyo |
| 2007/0258143 A1 | 11/2007 | Portney |

(Continued)

OTHER PUBLICATIONS

"Low f-Number Diffraction-Limited Pancharatnam-Berry Microlenses Enabled by Plasmonic Photopatterning of Liquid Crystal Polymers" by Miao Jiang, Yubing Guo, Hao Yu, Ziyuan Zhou, Taras Turiv, Oleg D. Lavrentovich, and Qi-Huo Wei Advanced Materials • Mar. 2019.

(Continued)

*Primary Examiner* — Kevin K Pyo
(74) *Attorney, Agent, or Firm* — Pequignot + Myers; Matthew A. Pequignot

(57) ABSTRACT

A wavefront sensor for determining a wavefront of an impinging light beam includes a microlens array formed by nanoimprint lithography. Each microlens of the microlens array includes a plurality of concentric ridges separated by concentric grooves. A ratio F of a width of the concentric ridges to a pitch p of the concentric ridges is a function of a radial distance r from a microlens center to the concentric ridges. An effective refractive index n of microlenses depends on a fill ratio of a binary pattern, which depends on the radial distance from the microlens center. A photodetector array is disposed downstream of the microlens array and configured for receiving the plurality of light spots at the focal plane. An imaging optical rangefinder includes the wavefront sensor, a pulsed light source for emitting probing pulses, and a photodetector for receiving reflected light pulses.

17 Claims, 11 Drawing Sheets

(56) References Cited

U.S. PATENT DOCUMENTS

2010/0214456 A1 8/2010 Tokuda et al.
2021/0215855 A1* 7/2021 Yu ..................... G02B 3/0037

OTHER PUBLICATIONS

"Importance of Molds for Nanoimprint Lithography: Hard, Soft, and Hybrid Molds" by B. Kwon and Jong H. Kim Hindawi Publishing Corporation, Journal of Nanoscience vol. 2016, Article ID 6571297.
"Broadband achromatic dielectric metalenses" by Sajan Shrestha, Adam C. Overvig, Ming Lu, Aaron Stein and Nanfang Yu Light: Science & Applications (2018)7:85 Official journal of the CIOMP 2047-7538.
International Search Report and Written Opinion for International Application No. PCT/US2020/062551, dated Feb. 26, 2021, 9 Pages.
International Preliminary Report on Patentability for International Application No. PCT/US2020/062551, dated Jul. 28, 2022, 8 pages.

* cited by examiner

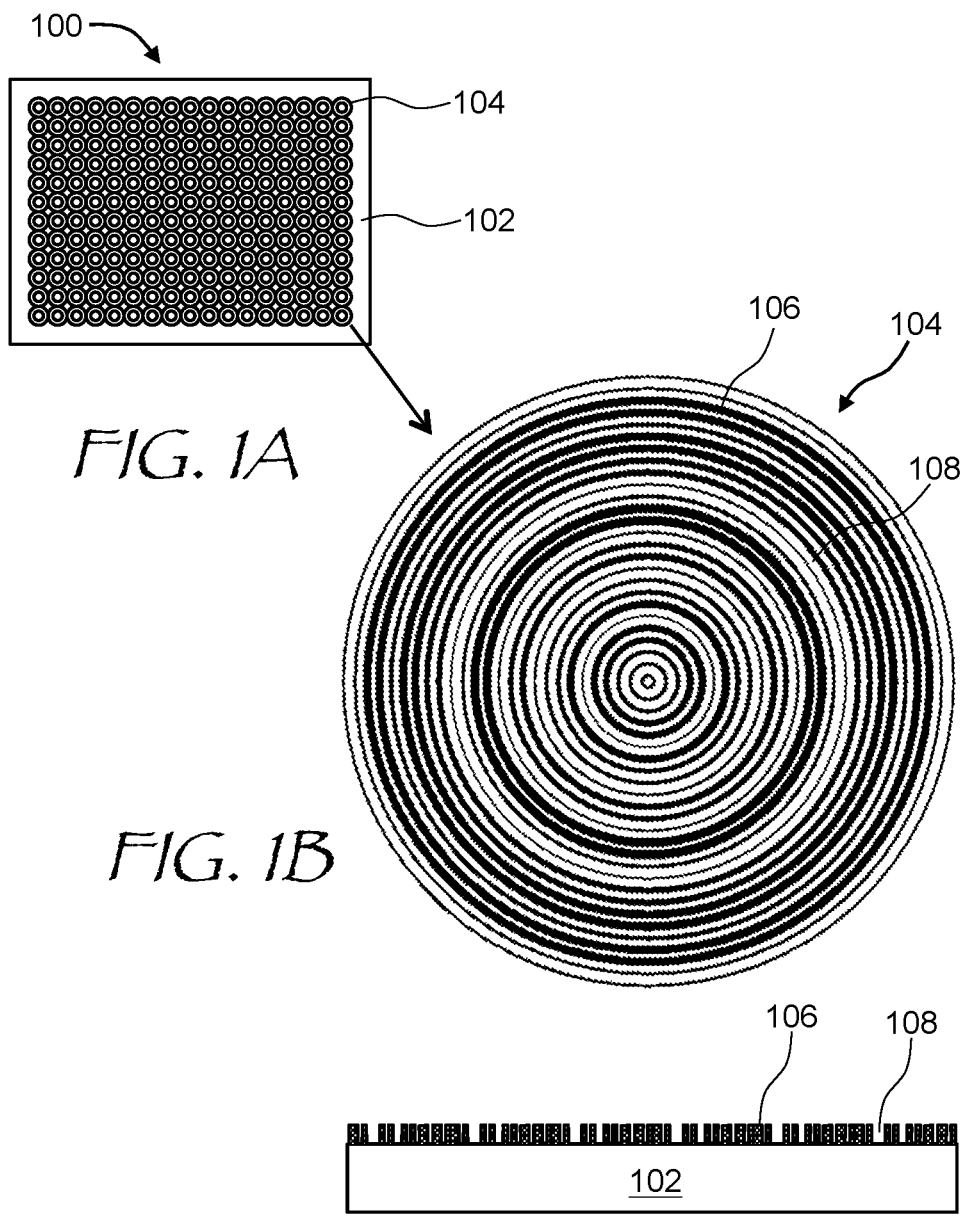
FIG. 1A
FIG. 1B
FIG. 1C
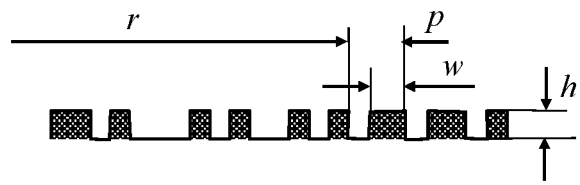
FIG. 1D

NANOIMPRINTED MICROLENS ARRAY AND WAVEFRONT SENSOR BASED THEREON

TECHNICAL FIELD

The present disclosure relates to optical components and modules, and in particular to microlens arrays and other components usable in wavefront sensors and display systems using same.

BACKGROUND

Micro-optics have many applications in areas such as imaging, remote sensing, display systems, optical communications, optical data processing, and so on. Micro-optics enable significant size and weight reduction of optical systems. Micro-optics may be produced inexpensively in large numbers using such processes as stack fabrication and dicing, injection molding, etc.

Micro-optics, such as arrays of microlenses for example, may be used in visual displays and arrayed photodetectors for increasing light efficiency, controlling field of view, and improving spatial directivity. Head mounted displays (HMD), helmet mounted displays, and near-eye displays (NED) are being used increasingly for displaying virtual reality (VR) content, augmented reality (AR) content, mixed reality (MR) content, and the like. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. External environment of a near-eye display may be tracked in real time, and the displayed imagery may be dynamically adjusted depending on the environment, as well as user's head orientation and gaze direction. To sense the environment, various systems may be deployed, e.g. special outward-facing camera systems.

Compact and efficient outside environment monitoring systems may greatly benefit a near-eye display by enabling the user to be immersed into the real-world environment. However, many modern outside monitoring and tracking systems are bulky and heavy. Because a display of HMD or NED is usually worn on the head of a user, a large, bulky, unbalanced, and/or heavy display device would be cumbersome and may be uncomfortable for the user to wear.

BRIEF DESCRIPTION OF THE DRAWINGS

Exemplary embodiments will now be described in conjunction with the drawings, in which:

FIG. 1A is a plan view of a microlens array component of the present disclosure;

FIG. 1B is a magnified view of a single microlens of the microlens array component of FIG. 1A;

FIG. 1C is a side view of the microlens of FIG. 1B;

FIG. 1D is a magnified cross-sectional view of the ridges of the microlens of FIG. 1C;

DETAILED DESCRIPTION

Figure 2:
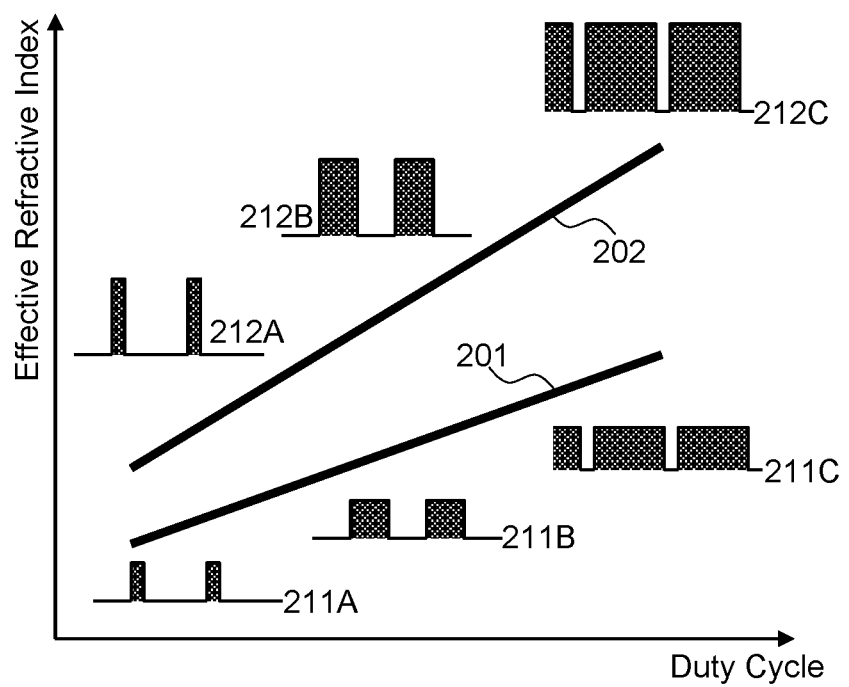
FIG. 2 is a graph showing dependence of effective refractive index on profile height and duty cycle of the microlens of FIGS. 1B-1D.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

One difference of a depth camera as compared to a regular camera is that an image obtained by a depth camera includes not only brightness and/or color information of an object being imaged, but also depth information, i.e. a three-dimensional shape of the object, or of a portion of the object visible to the camera and, in some cases, distance to the object being imaged. A depth camera may obtain information about distance and shape of visible objects by detecting not only optical power density and spectral distribution of an incoming light field, but also a wavefront shape of the light field.

Light field wavefront shape can be measured by using a wavefront sensor. A wavefront sensor may be constructed by placing a microlens array in front of a photodetector array, and processing photodetector array data to measure location of focal spots produced by individual microlenses relative to pixels of the photodetector array. Widespread use of microlens-based wavefront sensors has been hindered by high manufacturing costs, in particular high manufacturing costs of suitable microlens arrays. It is therefore highly desirable to produce high-quality, small-size microlenses inexpensively and with high yield.

In accordance with the present disclosure, an array of microlenses may be manufactured by nanoimprinting a fringe pattern on a suitable substrate capable of keeping the shape of the nanoimprint, e.g. using an imprint resist or elastomer that can be thermally or UV cured after nanoimprinting, followed by an optional reactive ion etching of the nanoimprinted resist layer. Such process allows one to obtain arrays of very small, precisely manufactured microlenses. When the nanoimprinted pattern includes flat binary patterns, very thin lenses may be obtained, much lower than equivalent refractive microlenses.

In accordance with the present disclosure, there is provided a wavefront sensor for determining a wavefront of an impinging light beam. The wavefront sensor includes a microlens array formed by nanoimprint lithography. Each microlens of the microlens array comprises a plurality of concentric ridges separated by concentric grooves. A ratio F of a width of the concentric ridges to a pitch p of the concentric ridges is a function of a radial distance r from a microlens center to the concentric ridges. The microlens array is configured for receiving the impinging light beam and providing a plurality of light spots at a focal plane of the microlens array. A location of light spots focused by individual microlenses of the microlens array is indicative of a local wavefront tilt of portions of the light beam impinging onto the corresponding individual microlenses of the microlens array. The wavefront sensor further includes a photodetector array disposed downstream of the microlens array and configured for receiving the plurality of light spots at the focal plane. Four photodetectors may be provided per each microlens of the microlens array. The wavefront sensor may be configured such that, when the impinging light beam has a flat wavefront parallel to a plane of the photodetector array, the light spot formed by each microlens is disposed at a common corner of the four photodetectors.

In some embodiments, the microlens array comprises a polymer e.g. a polymer layer on a substrate, which may be flat or curved. The plurality of concentric ridges may include circular ridges having a substantially same height. An effective refractive index n of each microlens of the array of microlenses may be the following function of the radial distance r: $n(r)=n_R F+n_G(1-F)$, where $n_R$ is a refractive index of the concentric ridges, and $n_G$ is refractive index of the concentric grooves. Each microlens may have a phase profile comprising a plurality of concentric phase profile segments having an amplitude of 2p and adding up to a parabolic phase profile. For example, each microlens may have a phase profile $$\phi'(r) = \left[\frac{2\pi}{\lambda}(\sqrt{f^2+r^2} - f) - \phi(0)\right] \mod 2\pi$$

where f is a focal length of the microlens, l is wavelength of impinging light, and f(0) is a phase at the microlens center. The pitch of the concentric ridges may be less than 400 nm. In some embodiments, each microlens of the array of microlenses is no greater than 0.01 mm.

In some embodiments, the wavefront sensor further includes a controller operably coupled to the photodetector array and configured to receive an image frame from the photodetector array. The image frame includes images of the light spots focused by corresponding microlenses of the array of microlenses. The controller may be further configured to compute a local wavefront tilt at each microlens from a position of the corresponding light spot in the image frame.

In accordance with the present disclosure, there is provided an imaging optical rangefinder comprising the wavefront sensor described above and a light source for emitting light for illuminating an object. In embodiments where the light source is a pulsed light source for emitting probing light pulses, the imaging optical rangefinder may further include a photodetector for receiving light pulses reflected from the object, and a a controller operably coupled to the wavefront sensor, the pulsed light source, and the photodetector.

The controller of the imaging optical rangefinder may be configured to operate the pulsed light source to emit a probing light pulse towards the object; receive an electric pulse from photodetector, the pulse corresponding to the reflected light pulse; determine a distance to the object from a time delay between emitting the probing light pulse and receiving the electric pulse; receive an image frame from the wavefront sensor, the image frame comprising images of the light spots focused by corresponding microlenses of the array of microlenses upon illumination with the reflected light pulse; and obtain a local wavefront tilt at each microlens from a position of the corresponding light spot in the image frame. The controller may be further configured to obtain a wavefront radius of the reflected light pulse from the obtained local wavefront tilts at each microlens, and to obtain a 3D profile of the object from wavefront radiae of reflected light pulses corresponding to the succession of probing light pulses.

In some embodiments, the imaging optical rangefinder further includes an optical scanner operably coupled to the pulsed light source and the controller. In such embodiments, the controller may be further configured to operate the pulsed light source to emit a succession of probing light pulses, and operate the optical scanner to scan the succession of probing light pulses over the object.

In accordance with the present disclosure, there is further provided a display device comprising the imaging optical rangefinder described above and a controller operably coupled to the imaging optical rangefinder and the optics block. The controller may be configured to operate the imaging optical rangefinder to obtain a 3D profile of an external object; provide an image to be displayed to the user, the image depending on the obtained 3D profile of the external object; and operate the optics block to display the image to the user. In embodiments where the display device is configured for placing near eyes of the user (i.e. the display device is a near-eye display device), the image may include a rendering of the 3D profile of the external object.

Referring now to FIGS. 1A, 1B, and 1C, a microlens array component 100 includes a substrate 102 and an array of microlenses 104 supported by the substrate 102. Each microlens of the array of microlenses 104 includes a plurality of concentric ridges 106 (black circles in FIG. 1B) extending from the substrate 102, i.e. upwards in FIG. 1C, and separated by concentric grooves 108 (white circles in FIG. 1B and gaps in FIG. 1C). A duty cycle, i.e. a ratio F of width w of the concentric ridges 106 to pitch p of the concentric ridges 106 varies with a radial distance r from a microlens center to the concentric ridges 106 (FIG. 1D). Herein, the term "concentric" means sharing a common center, and does not imply a particular shape of ridges/grooves, e.g. it does not imply that the shape has to be circular. Other shapes such as ellipses, rectangles, etc., may share a common center. The ridges may have a rectangular cross-section as shown in FIG. 1D, trapezoidal, cross-section, an oval or round cross-section, etc. With any shape of grooves, the microlenses 104 are not necessarily of a circular shape. For example, even when the concentric ridges 106 are circular, each microlens 104 may also have a square or rectangular shape.

The array of microlenses 104 may be formed by nano-imprinting, e.g. by depositing an imprint resist layer on the substrate, imprinting the imprint resist layer with a suitable mold having nano-scale ring pattern, and curing the imprint resist. Various methods of forming arrays of microlenses will be considered in more detail further below. The concentric grooves 108 may be filled with air or with a planarizing layer, not shown.

The microlenses 104 may be of any suitable shape, e.g. circular as illustrated, elliptical, rectangular, square, etc. The shape of the microlenses 104 does not need to be tied to the shape of the concentric grooves 106, e.g. the concentric grooves 106 may be circular, while the shape of the microlenses 104 may be square, for example. The microlenses 104 may be disposed on the substrate 102 in a rectangular pattern as shown, in honeycomb pattern, rhombic pattern, etc. The concentric ridges 106 may all have substantially same height h (FIG. 1D), or they may have different height, i.e. graded in going away from the center. The substrate 102 may be flat as shown, or may have a spherical or aspheric top and/or bottom surface. The substrate 102 may be made of a transparent or translucent material, including e.g. glass, crystal, plastic, semiconductor, etc.

In some embodiments, the duty cycle F may determine the effective local refractive index n(r) as follows:

$$n(r) = n_R F(r) + n_G (1 - F(r)),$$

where $n_R$ is the refractive index of the concentric ridges 106 and $n_G$ is the refractive index of the concentric grooves 108. If the concentric grooves 108 contain air, then $n_G = 1.0$.

Dependence of the effective refractive index n on profile height h and duty cycle F of the nanoimprinted pattern of the microlens 104 is illustrated in FIG. 2. A lower line 201 shows the dependence of the effective refractive index on the duty cycle F at a first profile height $h_1$, and an upper line 202 shows the dependence of the effective refractive index on the duty cycle F at a second, higher profile height $h_2$, i.e. $h_2 > h_1$. The varying duty cycle F is illustrated with lower inserts 211A, 211B, and 211C for the lower line 201, and with higher inserts 212A, 212B, and 212C for the upper line 202. One can see that it is possible to configure the microlenses 104 of the microlens array component 100 (FIG. 1A) to have a pre-defined radial variation of the effective refractive index n(r) to provide a refractive index profile of the microlenses 104 for achieving a desired light focusing property of the microlenses 104. The desired phase profile may be e.g. a parabolic profile, or any other profile usable to attain a desired focusing/collimating property of the microlens 104. In some embodiments, the desired phase profile of a microlens may be "folded" with $2\pi$ modulus to achieve substantially a same operating function as a microlens having a full bell-shaped phase profile, at least for monochromatic or narrowband light.

Figure 3:
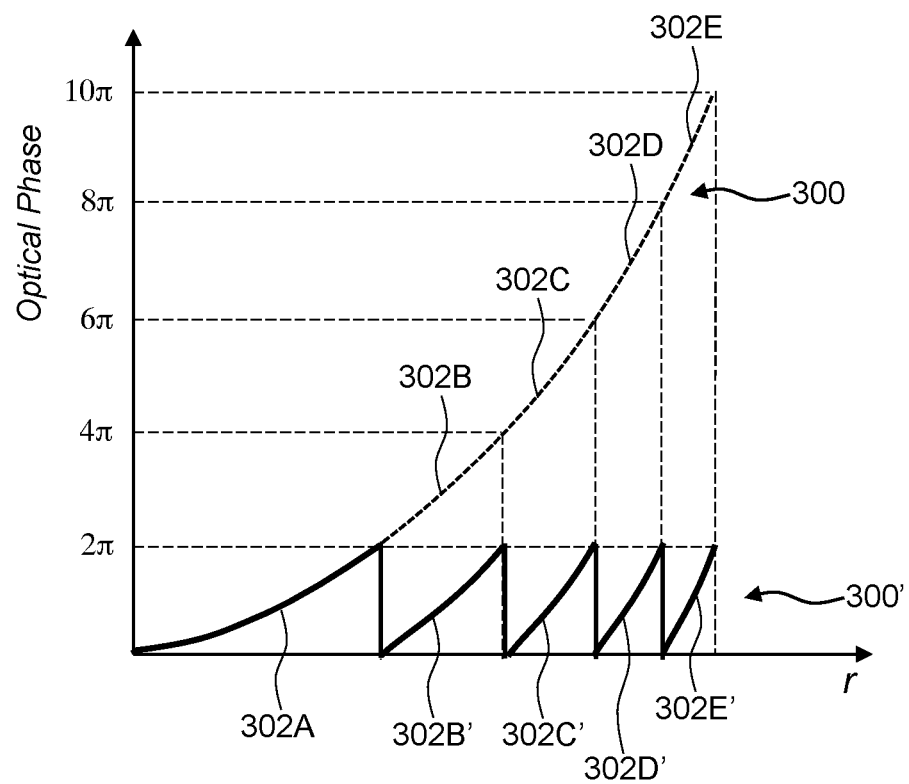
FIG. 3 is an exemplary phase profile of a microlens of this disclosure.

The "folded" phase profile is illustrated in FIG. 3. A desired parabolic phase profile 300 of a microlens is shown with a dashed line. The parabolic phase profile 300 extends over $10\pi$ of phase. The phase function $\phi(r)$ of the parabolic phase profile 300 may be represented by a function $$\phi(r) = \frac{2\pi}{\lambda}(\sqrt{f^2 + r^2} - f) - \phi(0) \quad (1)$$

where f is the focal length, $\lambda$ is wavelength of light, and $\phi(0)$ is the phase delay at the microlens center.

The phase function $\phi(r)$ may be broken into profile segments 302A, 302B, 302C, 302D, and 302E. The segments 302B, 302C, 302D, and 302E may be shifted down by an integer number of $2\pi$, to form a folded phase profile 300' comprising a plurality of concentric phase profile segments 302B', 302C', 302D', and 302E' having an amplitude of $2\pi$ and adding up to the parabolic phase profile 304. The folded phase profile 300' may be represented by a function $$\phi'(r) = \phi(r) \bmod 2\pi = \left[\frac{2\pi}{\lambda}(\sqrt{f^2 + r^2} - f) - \phi(0)\right] \bmod 2\pi \quad (2)$$

The folded phase profile 300' enables a considerable overall thickness reduction of the microlenses 104, because its amplitude does not exceed $2\pi$.

Figure 4A:
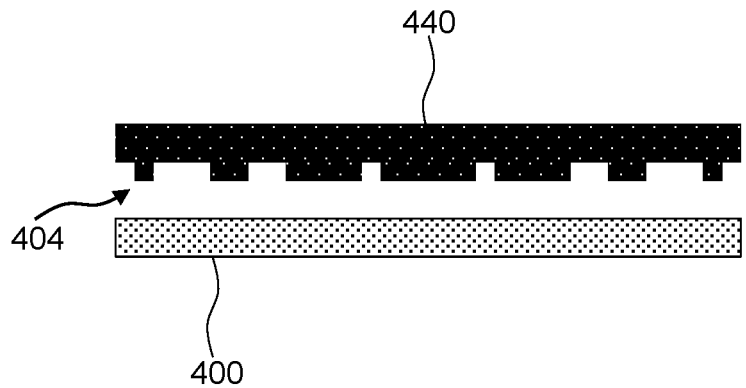
FIGS. 4A, 4B, and 4C are side cross-sectional views of a mold for production of a microlens of this disclosure by nanoimprinting.
Figure 4B:
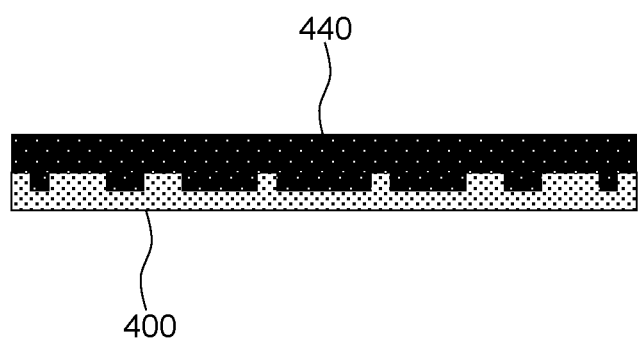
Figure 4C:
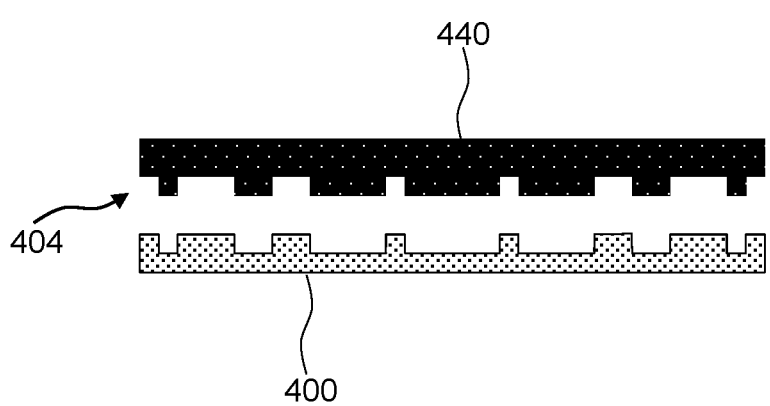

A general process of nanoimprinting is illustrated in FIGS. 4A, 4B, and 4C. A mold 440 shaped to include an inverted profile of an optic to be imprinted, e.g. an array of inverted microlenses 404, is positioned over a substrate 400 (FIG. 4A). The substrate 400 may include a curable imprint resist layer capable of completely filling the gaps of the inverted profile of the mold 440. Then, the mold 440 and the substrate 400 are brought together (FIG. 4B) by applying a mechanical pressure. The imprint resist layer may then be cured, e.g. thermally or UV-cured, to maintain the shape of imprinted microlenses or other optical elements. When the curing is complete, the mold 440 is lifted off the substrate (FIG. 4C).

Figure 4D:
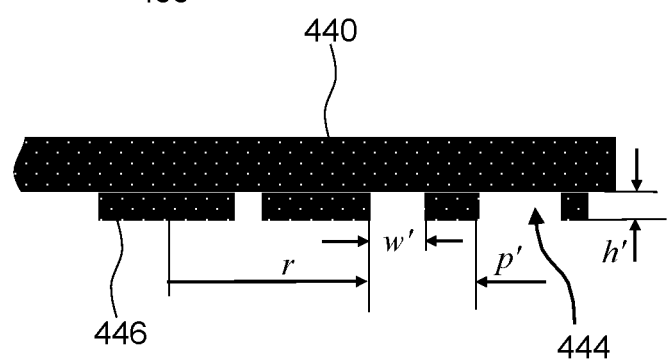
FIG. 4D is a magnified cross-sectional view of the ridges and grooves of an inverted microlens of the mold of FIGS. 4A to 4C.

To obtain the desired microlens shape imprinted into the substrate 400, each inverted microlens of the array of inverted microlenses of the mold 440 may include concentric mold ridges 446 (FIG. 4D) extending from the mold 440 and separated by concentric mold grooves 444. A ratio F' of a width w' of the concentric mold grooves to a pitch p' of the concentric mold grooves 444 is a function of a radial distance r' from an inverted microlens center to the concentric mold grooves 444 (FIG. 4D). The function F'(r') is the same function as the desired fill ratio function F(r) of the microlenses:

$$F'(r') = F(r) \text{ at } r' = r \quad (3)$$

In the embodiment shown, the concentric mold ridges 442 have a substantially same height h'.

Nanoimprinting process enables printing of features with characteristic size of less than 1 micrometer, typically tens to hundreds nanometers. This enables the production of very compact microlenses. Referring back to FIGS. 1A to 1D, the height h of the concentric ridges 108 (FIGS. 1B, 1C, and 1D) of the nanoimprinted microlenses 104 may be less than 1700 nm; or less than 900 nm; or even less than 300 nm. The pitch p of the concentric ridges 106 may be less than 400 nm; less than 150 nm; or even less than 50 nm. Each microlens 104 of the microlens array component 100 may be quite small in footprint, e.g. no greater than 0.1 mm in diameter; no greater than 0.01 mm in diameter; or even no greater than 2-3 micrometers in diameter with the pitch of the concentric ridges 106 of less than 600 nm or less than 400 nm, e.g. about 200-300 nm, depending on wavelength of imaged light.

Figure 5:
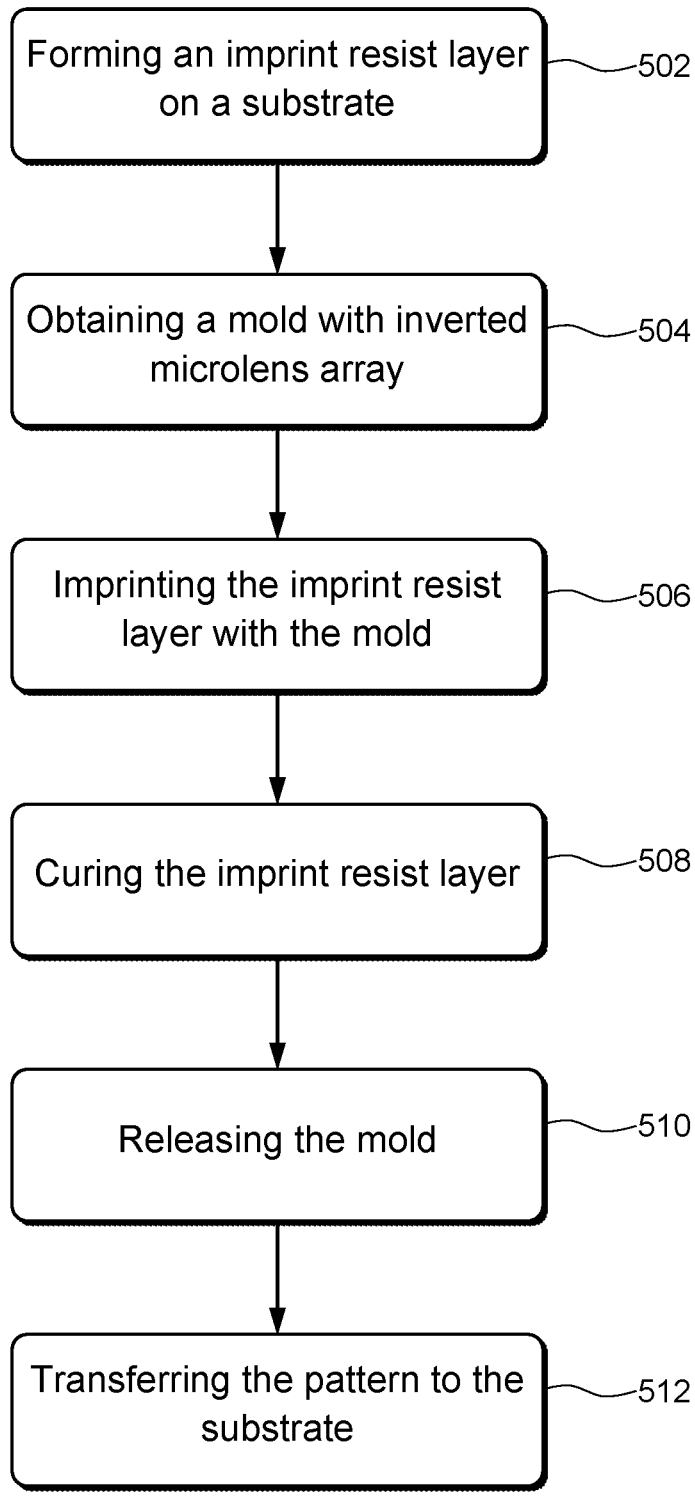
FIG. 5 is a flowchart of an example method of manufacturing a microlens array of this disclosure by nanoimprinting.

Referring now to FIG. 5, a method 500 of manufacturing a microlens array component, e.g. the microlens array component 100 of FIGS. 1A to 1D, includes forming (502) an imprint resist layer, e.g. an elastomer layer, on a substrate. The imprint resist layer is a material that conforms to the mold shape down to very small feature size, e.g. 20 nm or less, upon application of a controlled amount of pressure onto the imprint resist by the mold. The imprint resist can include e.g. a thermo- and/or photopolymerizable polymer or monomer mixture, which can solidify at elevated temperatures and/or upon illumination with UV light. In some embodiments, the imprint resist layer may includes polydimethylsiloxane (PDMS), for example, or another suitable polymer.

A mold is obtained (504), e.g. micromachined in a firm substrate using e-beam nanolithography or another suitable method. The mold geometry may be selected to be inverse to that of an optical component to be manufactured, e.g. as has been explained above with reference to FIGS. 4A to 4D.

The imprint resist layer is imprinted (506) with the mold by applying pressure and/or heating above the glass transition temperature of the imprint resist material. While the pressure is applied, the imprint resist layer is cured (508) to preserve the imprinted shape. Heating and/or UV illumination may be used to cure the imprint resist layer. Adhesion between the mold and the imprint resist may be controlled to enable the imprinted pattern to be eventually released (510) from the mold. The microlens or array of microlenses may be formed in the imprint resist layer.

In some embodiments, the pattern imprinted into the polymer layer may be transferred to the underlying substrate. The pattern transfer may be performed e.g. by reactive ion etching. Briefly, the released imprinted pattern is bombarded with ions reactive with the substrate. Exposed areas of the substrate will be etched away, while areas of the substrate protected with the resist will not be etched. Alternatively, the resist layer may also be etched by the reactive ions, at the same or a different rate, depending on chemical composition. When all of the imprint resist layer is etched away to the level of substrate, the pattern nanoimprinted into the resist layer is effectively transferred into the substrate because the exposed areas of the substrate had more time to be etched than areas protected by the imprint resist layer. Thus, the end product includes the desired pattern, e.g. a microlens array pattern, be imprinted in the substrate itself. The remaining imprint resist layer, if any, may then be stripped away.

Figure 6A:
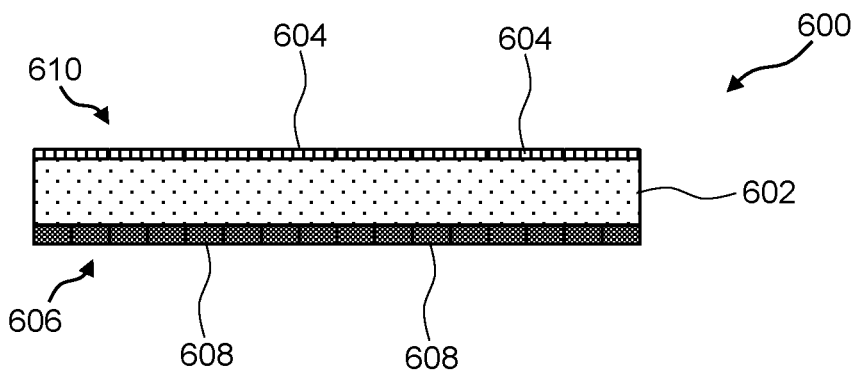
FIGS. 6A and 6B are cross-sectional and plan views, respectively, of a wavefront sensor including a microlens array component fabricated using the method of FIG. 5.
Figure 6B:
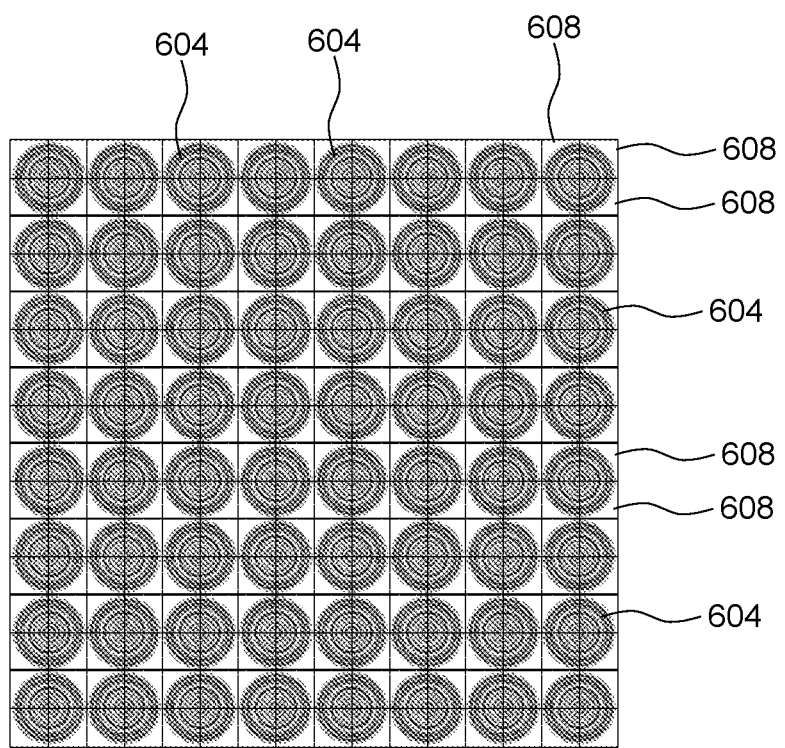

Referring to FIGS. 6A and 6B, a wavefront sensor 600 includes a substrate 602 supporting a microlens array 610 and a photodetector array 606 on opposite sides of the substrate 602. The microlens array 610 includes an array of microlenses 604. The microlens array 610 may include any of the microlenses and/or microlens arrays described above, e.g. the microlens array component 100 of FIG. 1A including an array of nanoimprinted microlenses 104. The substrate 602 is transparent to light being detected. By way of non-limiting examples, the substrate 602 may include glass, sapphire, semiconductor, etc. The photodetector array 606 includes an array of photodetectors 608. Several photodetectors 608 may be provided per each microlens 604 of the microlens array 610. For example, as can be seen from FIG. 6B, four photodetectors 608 are provided per each microlens 604 of the microlens array 610. The two arrays 606 and 610 may be disposed such that, when the impinging light beam has a flat wavefront parallel to a plane of the photodetector array 608, the light spot formed by each microlens 604 is disposed at a common corner of the corresponding four photodetectors 608.

Figure 7A:
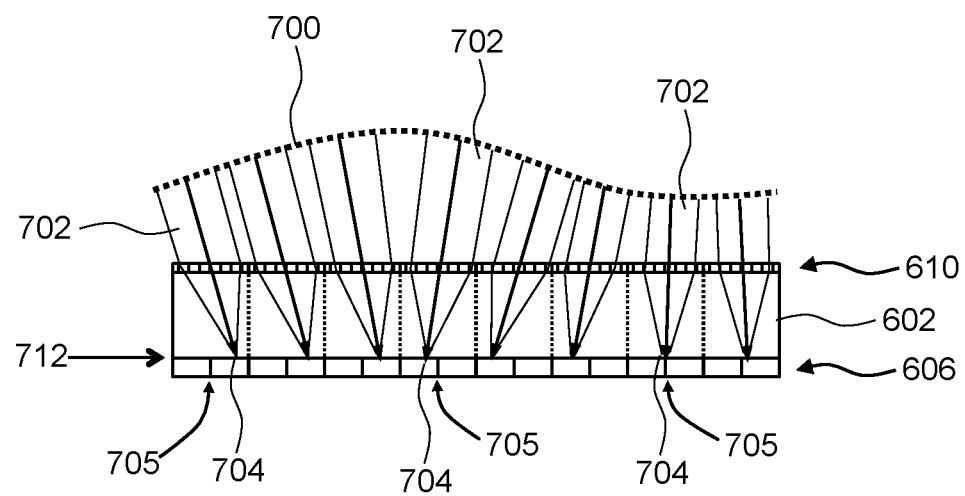
FIG. 7A is a side cross-sectional view of the wavefront sensor of FIGS. 6A and 6B, illustrating a principle of wavefront reconstruction.
Figure 7B:
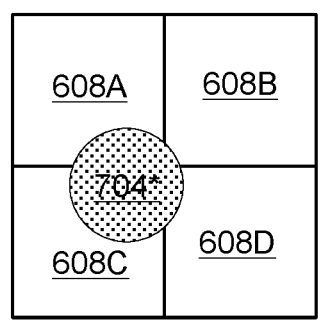
FIG. 7B is a plan view of a quad of pixels coupled to a microlens of the microlens array of the wavefront sensor of FIG. 7A, showing a focal spot offset due to a tilted wavefront of a light beam portion impinging onto the microlens.

The operation of the wavefront sensor 600 is illustrated in FIGS. 7A and 7B. The microlens array 610 receives an impinging light beam having a wavefront 700. The microlens array 610 provides a plurality of light spots 704 at a focal plane 712 of the microlens array 610. The light spots 704 are formed by focusing light beam portions 702 by the corresponding microlenses 604, as shown in FIG. 7A. The photodetector array 606 is disposed downstream of the microlens array 610 and configured for receiving the plurality of the light spots 704 at the focal plane 712. It is seen from FIG. 7A that a location of the light spots 704 focused by individual microlenses 604 of the microlens array 610 relative to centers 705 corresponding to normal incidence of the light beam onto the microlens array 610 is indicative of a local wavefront tilt of the light beam portions 702 impinging onto the corresponding individual microlenses 604.

Referring to FIG. 7B, a light spot 704* is offset from a common corner of four photodetectors 608A, 608B, 608C, and 608D. The photodetectors 608A, 608B, 608C, and 608D receive a light spot 704* and provide respective photocurrents $I_A$, $I_B$, $I_C$, and $I_D$ proportional to portions of optical power received by the corresponding photodetectors 608A, 608B, 608C, and 608D. The ratio of photocurrents $(I_A+I_C)/(I_B+I_D)$ is indicative of the horizontal position of the light spot 704* in FIG. 7B, and the ratio of photocurrents $(I_A+I_B)/(I_C+I_D)$ is indicative of the vertical position of the light spot 704* in FIG. 7B. The sum of the photocurrents $I_A+I_B+I_C+I_D$ is indicative of optical power of the light spot 704*. Therefore, photocurrents of the four photodetectors 608A, 608B, 608C, and 608D are indicative of the local optical power density and the wavefront tilt of a portion of the light beam impinging onto a microlens coupled to the four photodetectors 608A, 608B, 608C, and 608D. Once the tilts of the wavefront portions of the wavefront 700 are known, the wavefront 700 can be reconstructed by stitching the tilted portions. In this manner, photocurrents of all photodetectors 608 of the photodetector array 606 may be used to reconstruct the wavefront 700 and optical power density distribution across an impinging light beam.

Figure 8:
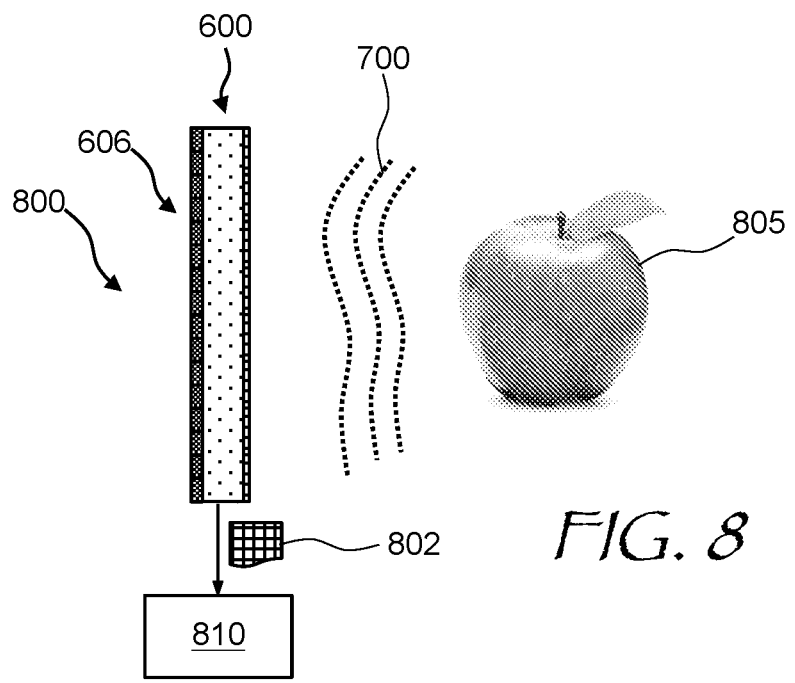
FIG. 8 is a schematic cross-sectional view of the wavefront sensor in a depth camera configuration.

Referring to FIG. 8, a wavefront sensor 800 is similar to the wavefront sensor 600 of FIGS. 6A and 6B. The wavefront sensor 800 of FIG. 8 further includes a controller 810 operably coupled to the photodetector array 606. The controller 810 is configured to receive an image frame 802 from the photodetector array 606. The image frame 802 includes images of the light spots 704 (FIG. 7A) focused by corresponding microlenses 604 of the array of microlenses 610. The controller 810 (FIG. 8) may be further configured to compute a local wavefront tilt at each microlens 604 from a position of the corresponding light spot 704 in the image frame 802. The position of the light spots 704 may be determined from the optical power ratios of the photodetector photocurrents as explained above. In some embodiments, the controller 810 may be configured to process the wavefront position and optical power density distribution data to process the wavefront position and optical power density distribution data to obtain a propagation direction and phase profile of the reflected light. In other words, the controller 810 may effectively propagate the wavefront 700 back to an object 805 which generated the wavefront 700 and reconstruct the shape of the object 805.

Figure 9:
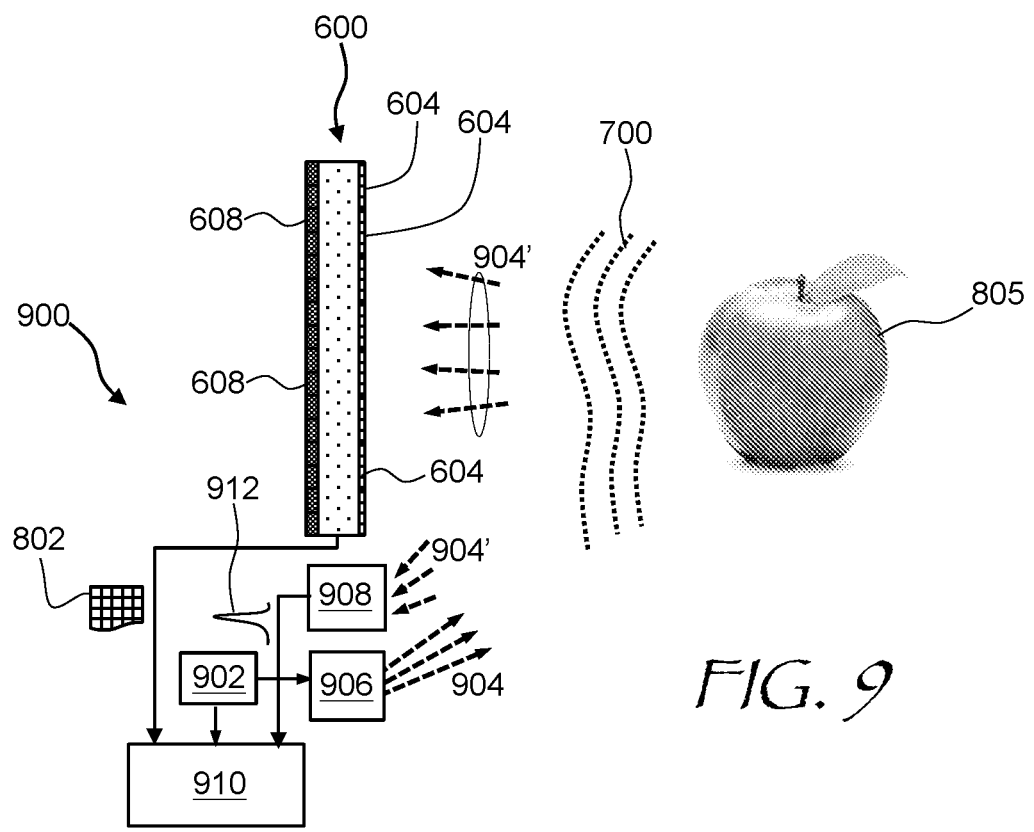
FIG. 9 is a schematic view of an imaging optical rangefinder using the wavefront sensor of FIG. 8.

Referring to FIG. 9, an imaging optical rangefinder 900 includes the wavefront sensor 600 of FIGS. 6A and 6B, and may include a light source 902 (FIG. 9) configured to emit illuminating light, e.g. probing light pulses 904, for illuminating the object 805. The light source 902 may include a laser diode driven by nanosecond electrical pulses, for example. An optical scanner 906 may be operably coupled to the light source 902. The optical scanner 906 may be configured to scan the probing light pulses 904 in one dimension, e.g. left to right or up-down, or two dimensions, e.g. left-right and up-down. In some embodiments, the optical scanner 906 may include a tiltable microelectromechanical system (MEMS) reflector. The MEMS reflector may be tiltable about one axis or about two orthogonal axes. Two one-dimensional MEMS tiltable reflectors coupled via an optical pupil relay may also be used.

A fast photodetector 908 may be provided to receive light pulses 904' reflected from the object 805. The photodetector 908 may include, for example, a fast photodiode capable of detecting the reflected light pulses 904' with temporal resolution sufficient for optical rangefinding purposes. A controller 910 may be operably coupled to the wavefront sensor 600, the light source 902, and the photodetector 904.

The controller 910 may be configured to operate the light source 902 to emit a probing light pulse 904 towards the object 805. The controller 910 may receive an electric pulse 912 from photodetector 908, the electric pulse 912 corresponding to a light pulse 904' reflected from the object 805. The controller 910 may determine a distance to the object 805 from a time delay between emitting the probing light pulse 904 and receiving the electric pulse generated by the photodetector 908 upon receiving the reflected light pulse 904'. The controller 910 may also be configured to receive the image frame 802 from the wavefront sensor 600. The image frame 802 includes images of the light spots focused by corresponding microlenses 604 of the array of microlenses 610 upon illumination with the reflected light pulse 904', or upon illumination with another light source. Then, the controller 910 may obtain a local wavefront tilt at each microlens 610 from a position of the corresponding light spot in the image frame 802.

The controller 910 may then reconstruct the total wavefront and optical power density distribution of the light beam reflected from the object 805 and impinging onto the wavefront sensor 600. Information related to a distance to the object 805 and/or shape of the object 805 may be obtained from the reconstructed data. For example, the controller 910 may obtain a wavefront radius of the reflected light pulse from the obtained local wavefront tilts at each microlens 604. The distance to the object 805 may be determined from the wavefront radius. In some embodiments, the controller 910 may be configured to obtain a 3D profile of the object from wavefront radiae of reflected light pulses 904' corresponding to the succession of probing light pulses 904. To that end, the controller 910 may operate the light source 902 to emit a succession of the probing light pulses 904, and may operate the optical scanner 906 to scan the succession of probing light pulses 904 over the object 805. In some embodiments, the light source 902 may be used to merely illuminate the object 805 for detection by the wavefront sensor 600. The light source 902, therefore, does not need to be a pulsed light source; it may provide continuous-wave illuminating light, e.g. near-infrared light, to illuminate the object 805.

Figure 10:
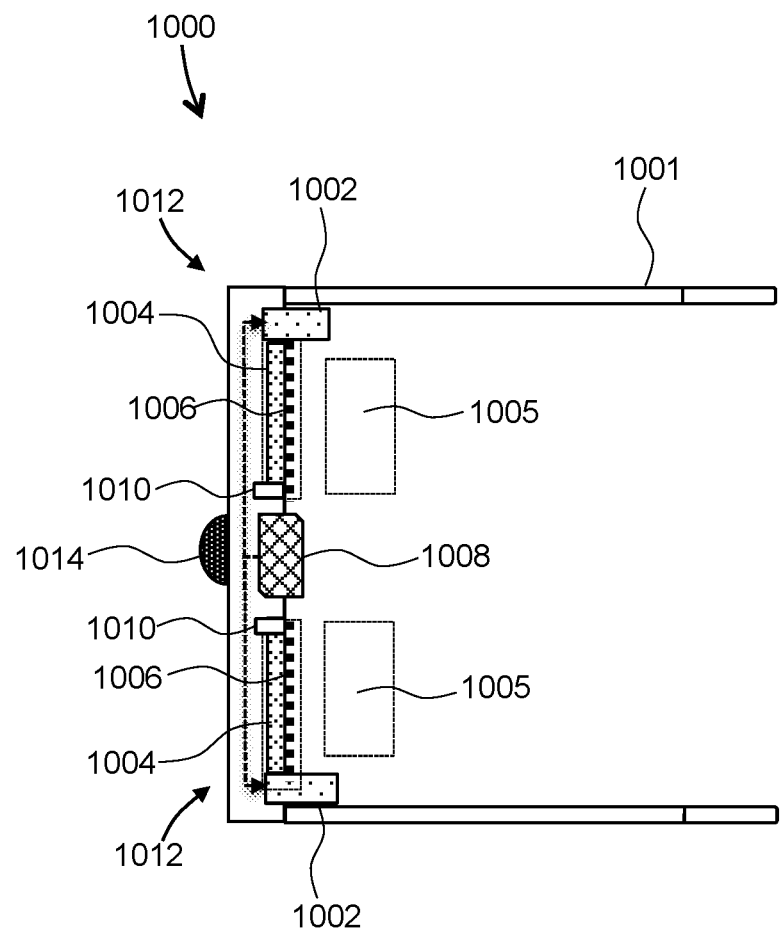
FIG. 10 is a top cross-sectional view of a near-eye display of this disclosure including the imaging optical rangefinder of FIG. 9.

Turning to FIG. 10, a display device 1000 includes a frame 1001, which may have a shape of eyeglasses, for example. The frame 1001 supports, for each eye: an image source 1002 for providing image light carrying an image in angular domain; and a pupil-replicating waveguide 1004 optically coupled to the image source 1002 and configured to provide the image light to an eyebox 1005 of the display device 1000. The pupil-replicating waveguide 1004 may include grating couplers 1006. The image source 1002 and the pupil-replicating waveguide 1004 together form an optics block 1012 for presenting images to a user. In other embodiments, the optics block 1012 may be constructed differently, and may include display panels, varifocal lenses, etc.

The display device 1000 may further include a controller 1008 operably coupled to the image sources 1002 for providing image frames to be displayed to the left and right eyes of the user placed at the eyeboxes 1005. An eye tracker 1010 may be operably coupled to the controller 1008 for providing a real-time information about user eye's position and/or orientation. The controller 1008 may be configured to determine the user's current gaze direction from that information, and adjust the image frames to be displayed to the user, for a more realistic immersion of the user into virtual or augmented environment.

The display device 1000 may further include an imaging optical rangefinder 1014, e.g. the imaging optical rangefinder 900 of FIG. 9. The controller 1008 may be operably coupled to the imaging optical rangefinder 1014 and suitably configured, e.g. programmed, to operate the imaging optical rangefinder to obtain a 3D profile of an external object. The controller 1008 may then provide an image to be displayed to the user at the eyeboxes 1005. The image may depend on the obtained 3D profile of the external object. For example, for virtual reality (VR) applications, the imaging optical rangefinder 1014 may obtain 3D shapes of external objects, and the image rendering software run by the controller 1008 may operate the optics blocks 1012 to provide a rendering of the 3D profile of the external object to the viewer. For augmented reality (AR) applications, the image rendering software run by the controller 1008 may augment the external 3D shapes with artificial features, as required by the application.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
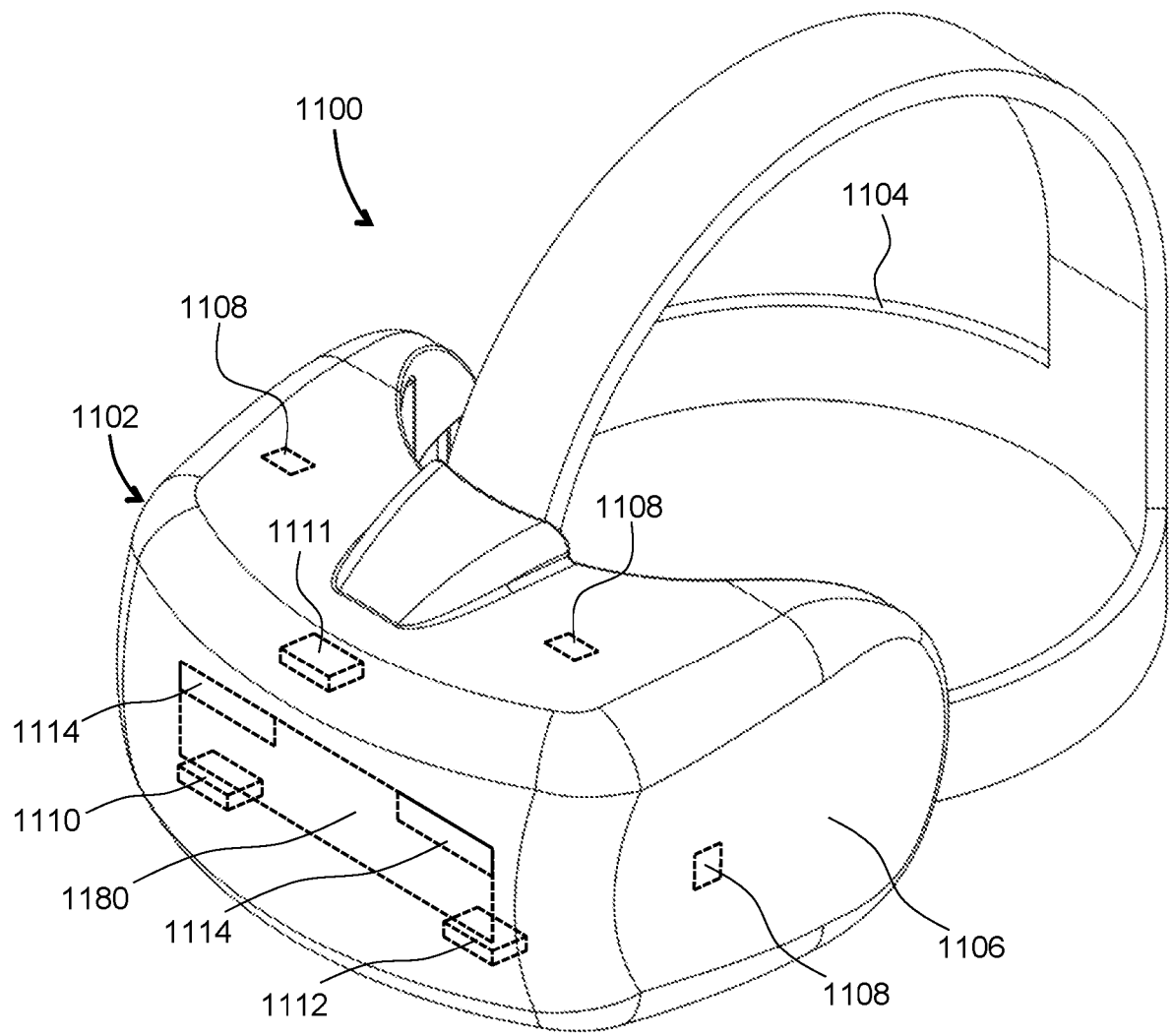
FIG. 11A is an isometric view of a virtual reality display headset of this disclosure.

Referring to FIG. 11A, an HMD 1100 is an example of an AR/VR wearable display system which encloses the user's face, for a greater degree of immersion into the AR/VR environment. The HMD 1100 is an embodiment of the display device 1000 of FIG. 10, for example. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
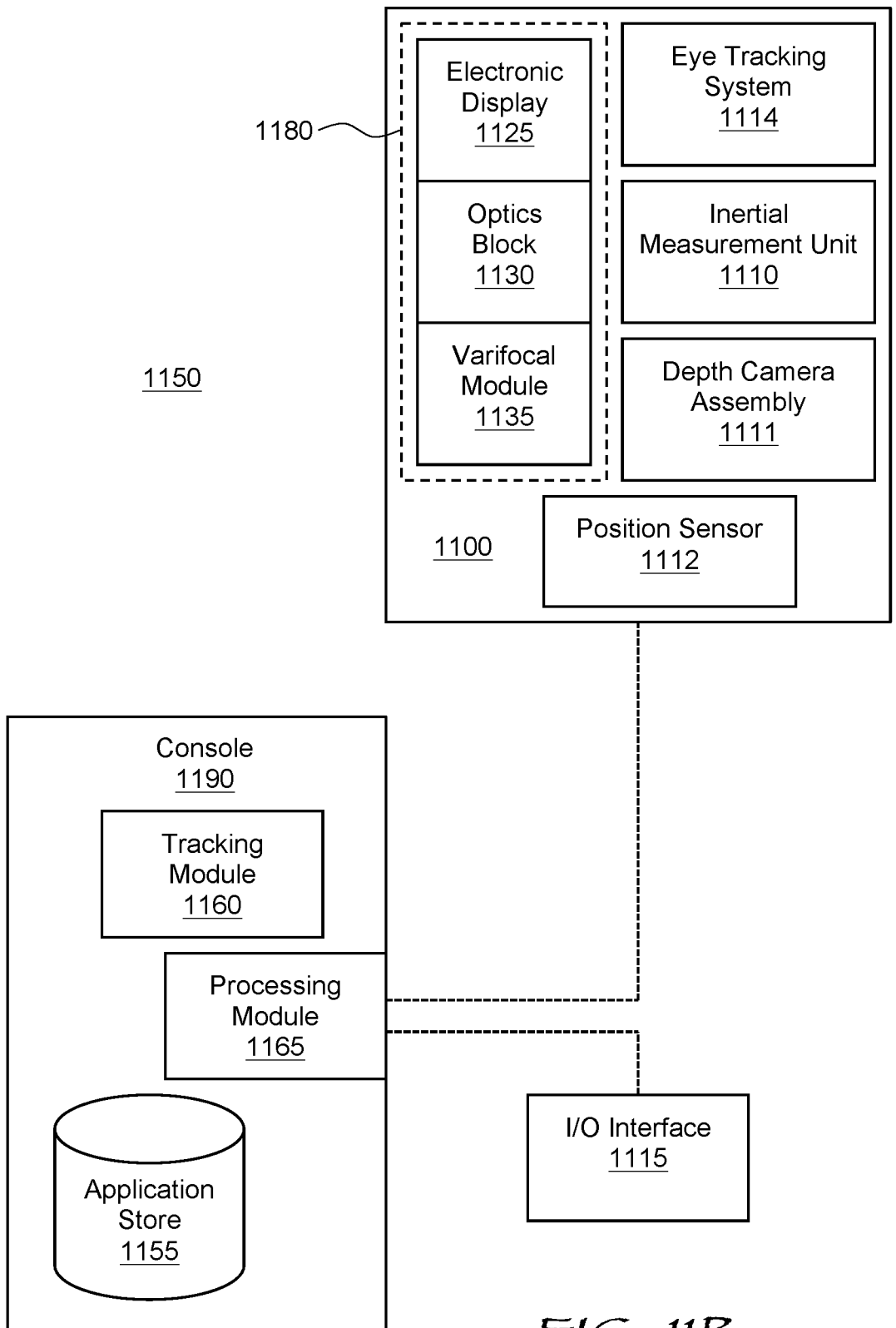
FIG. 11B is a block diagram of a virtual reality system including the headset of FIG. 10A.

Referring to FIG. 11B, an AR/VR system 1150 is an example implementation of the display device 1000 of FIG. 10. The AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may recalibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wavefront sensor for determining a wavefront of an impinging light beam, the wavefront sensor comprising:
  a microlens array formed by nanoimprint lithography, wherein each microlens of the microlens array comprises a plurality of concentric ridges separated by concentric grooves, wherein a ratio F of a width of the concentric ridges to a pitch p of the concentric ridges is a function of a radial distance r from a microlens center to the concentric ridges, and wherein the microlens array is configured for receiving the impinging light beam and providing a plurality of light spots at a focal plane of the microlens array, wherein a location of light spots focused by individual microlenses of the microlens array is indicative of a local wavefront tilt of portions of the light beam impinging onto the corresponding individual microlenses of the microlens array; and
  a photodetector array disposed downstream of the microlens array and configured for receiving the plurality of light spots at the focal plane, the photodetector array comprising four photodetectors per each microlens of the microlens array;
  wherein, when the impinging light beam has a flat wavefront parallel to a plane of the photodetector array, the light spot formed by each microlens is disposed at a common corner of the four photodetectors.

2. The wavefront sensor of claim 1, wherein the microlens array comprises a polymer.

3. The wavefront sensor of claim 1, wherein the microlens array comprises a polymer layer on a substrate.

4. The wavefront sensor of claim 3, wherein the substrate is flat.

5. The wavefront sensor of claim 1, wherein the plurality of concentric ridges comprises circular ridges having a substantially same height.

6. The wavefront sensor of claim 1, wherein an effective refractive index n of each microlens of the microlens array is a function of the radial distance r $$n(r)=n_R F+n_G(1-F),$$

wherein $n_R$ is a refractive index of the concentric ridges, and $n_G$ is refractive index of the concentric grooves.

7. The wavefront sensor of claim 6, wherein each microlens has a phase profile comprising a plurality of concentric phase profile segments having an amplitude of $2\pi$ and adding up to a parabolic phase profile.

8. The wavefront sensor of claim 6, wherein each microlens has a phase profile $$\phi'(r) = \left[\frac{2\pi}{\lambda}(\sqrt{f^2 + r^2} - f) - \phi(0)\right] \bmod 2\pi$$

wherein f is a focal length of the microlens, $\lambda$ is wavelength of impinging light, and $\phi(0)$ is a phase at the microlens center.

9. The wavefront sensor of claim 1, wherein the pitch of the concentric ridges is less than 400 nm.

10. The wavefront sensor of claim 1, wherein each microlens of the microlens array is no greater than 0.01 mm.

11. The wavefront sensor of claim 1, further comprising a controller operably coupled to the photodetector array and configured to:
  receive an image frame from the photodetector array, the image frame comprising images of the light spots focused by corresponding microlenses of the microlens array; and
  compute a local wavefront tilt at each microlens from a position of the corresponding light spot in the image frame.

12. An imaging optical rangefinder comprising:
  a wavefront sensor for determining a wavefront of an impinging light beam, the wavefront sensor comprising:
    a microlens array formed by nanoimprint lithography, wherein each microlens of the microlens array comprises a plurality of concentric ridges separated by concentric grooves, wherein a ratio F of a width of the concentric ridges to a pitch p of the concentric ridges is a function of a radial distance r from a microlens center to the concentric ridges, and wherein the microlens array is configured for receiving the impinging light beam and providing a plurality of light spots at a focal plane of the microlens array, wherein a location of light spots focused by individual microlenses of the microlens array is indicative of a local wavefront tilt of portions of the light beam impinging onto the corresponding individual microlenses of the microlens array; and
    a photodetector array disposed downstream of the microlens array and configured for receiving the plurality of light spots at the focal plane;
  a pulsed light source for emitting light pulses for illuminating an object;
  a photodetector for receiving light pulses reflected from the object; and
  a controller operably coupled to the wavefront sensor, the pulsed light source, and the photodetector, and configured to:
    operate the pulsed light source to emit a probing light pulse towards the object;
    receive an electric pulse from photodetector, the electric pulse corresponding to the reflected light pulse;
    determine a distance to the object from a time delay between emitting the probing light pulse and receiving the electric pulse;
    receive an image frame from the wavefront sensor, the image frame comprising images of the light spots focused by corresponding microlenses of the microlens array upon illumination with the reflected light pulse; and
    obtain a local wavefront tilt at each microlens from a position of the corresponding light spot in the image frame.

13. The imaging optical rangefinder of claim 12, wherein the controller is further configured to obtain a wavefront radius of the reflected light pulse from the obtained local wavefront tilts at each microlens.

14. The imaging optical rangefinder of claim 13, wherein the controller is further configured to:
  operate the pulsed light source to emit a succession of probing light pulses; and obtain a 3D profile of the object from wavefront radiae of reflected light pulses corresponding to the succession of probing light pulses.

15. The imaging optical rangefinder of claim 12, further comprising an optical scanner operably coupled to the pulsed light source and the controller, wherein the controller is further configured to:
operate the pulsed light source to emit a succession of probing light pulses; and
operate the optical scanner to scan the succession of probing light pulses over the object.

16. A display device comprising:
an imaging optical rangefinder comprising:
a wavefront sensor for determining a wavefront of an impinging light beam, the wavefront sensor comprising:
a microlens array formed by nanoimprint lithography, wherein each microlens of the microlens array comprises a plurality of concentric ridges separated by concentric grooves, wherein a ratio F of a width of the concentric ridges to a pitch p of the concentric ridges is a function of a radial distance r from a microlens center to the concentric ridges, and wherein the microlens array is configured for receiving the impinging light beam and providing a plurality of light spots at a focal plane of the microlens array, wherein a location of light spots focused by individual microlenses of the microlens array is indicative of a local wavefront tilt of portions of the light beam impinging onto the corresponding individual microlenses of the microlens array; and
a photodetector array disposed downstream of the microlens array and configured for receiving the plurality of light spots at the focal plane; and
a light source for emitting light for illuminating an object;
an optics block for presenting images to a user; and
a controller operably coupled to the imaging optical rangefinder and the optics block and configured to:
operate the imaging optical rangefinder to obtain a 3D profile of an external object;
provide an image to be displayed to the user, the image depending on the obtained 3D profile of the external object; and
operate the optics block to display the image to the user.

17. The display device of claim 16 configured for placing near eyes of the user, wherein the image includes a rendering of the 3D profile of the external object.

* * * * *